United States Patent [19]

Yabuuchi et al.

[11] 4,414,640
[45] Nov. 8, 1983

[54] ARITHMETICAL METHOD FOR DIGITAL DIFFERENTIAL ANALYZER

[75] Inventors: Shigeru Yabuuchi, Hinodemachi; Takeyuki Endoh, Kodaira, both of Japan

[73] Assignees: Hitachi, Ltd.; Hitachi Denshi Kabushiki Kaisha, both of Tokyo, Japan

[21] Appl. No.: 294,061

[22] Filed: Aug. 18, 1981

[30] Foreign Application Priority Data

Aug. 18, 1980 [JP] Japan ................... 55-112739

[51] Int. Cl.³ ............................................. G06F 7/64
[52] U.S. Cl. ............................................. 364/702
[58] Field of Search .................................. 364/702

[56] References Cited

U.S. PATENT DOCUMENTS

| | | | |
|---|---|---|---|
| 3,598,974 | 10/1971 | Lincoln | 364/702 |
| 3,701,890 | 10/1972 | Dummermuth | 364/702 |
| 3,934,130 | 1/1976 | Friberg | 364/702 |
| 4,293,918 | 10/1981 | Asakawa | 364/702 |

Primary Examiner—Jerry Smith
Attorney, Agent, or Firm—Antonelli, Terry & Wands

[57] ABSTRACT

A method of operation of a digital differential analyzer for performing the operation:

$$R_i = R_{i-1} + (Y_i + K \sum_{l=1}^{n} \Delta Y_l) \Delta X_i - \Delta Z_i$$

where Y is an integrand, $\Delta Y$ is an increment of an input variable, R is a residue of the integrated value of the integrand, $\Delta X$ is an increment of an independent variable, $\Delta Z$ is an output increment of the integrated value of the integrand, K is a constant and n is an input number (a positive integer), in the ith iteration, uses a first mantissa $M_1$, a second mantissa $M_2$, a first exponent $E_1$ and a second exponent $E_2$ for expressing the abovementioned equation as follows, $$R_{i-1} = M_1 \times 2^{E_1}, (Y_i + K \sum_{l=1}^{n} \Delta Y_l) \Delta X_i = M_2 \times 2^{E_2},$$

then adjusts the radix points of the first and second mantissae in the bit number corresponding to the difference between the first and second exponents to adjust the mantissa portion to the greater exponent of the two, and thereafter calculates the mantissa portion to perform the abovementioned arithmetical operation and to obtain $\Delta Z$ and R; the improvement wherein the mantissa portion of $\Delta Z$ is expressed in terms of m ($\geq 2$) bits by adding the most-significant bit corresponding to the first bit above the radix point to bits below the radix point and the radix point is then adjusted in accordance with the result of addition in order to obtain $\Delta Z$ and R in accordance with the quantity of the result of addition for each iteration.

8 Claims, 7 Drawing Figures

FIG. 1(III)
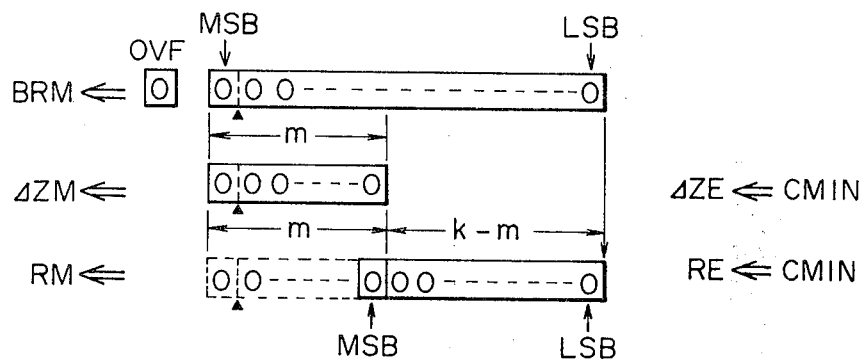

ARITHMETICAL METHOD FOR DIGITAL DIFFERENTIAL ANALYZER

FIELD OF THE INVENTION

This invention relates in general to the high speed numerical solution of differential equations by a device and method employing floating point arithmetic, and more particularly, to a digital differential analyzer which is used for solving a differential equation at high speed and for producing a numerical solution with high accuracy, or for generating a complicated curved line or surface, by adapting the digital differential analyzer to a floating point arithmetical method.

BACKGROUND OF THE INVENTION

In performing an arithmetical operation such as integration by use of a digital differential analyzer, fixed point arithmetic methods have heretofore been employed because these methods make it possible to reduce the amount of hardware required, and this inevitably leads to reduction in the cost of the apparatus.

In accordance with fixed point arithmetical methods, all operations take place in an invariant manner without consideration of the location of the radix point. This is illustrated by certain desk calculation and by slide rules, with which the operation must keep track of the decimal point. Thus, all variables that are to be processed by an arithmetical unit, such as an integrator, on the basis of fixed-point arithmetic, must be scaled. That is, the operands and the results of all arithmetic operations must be properly aligned so as to have a magnitude between certain fixed values. In the same way as in an analog computer, this scaling is an extremely-complicated job to be carried out manually, and since the scaling coefficients are based on a predicted or forecasted maximum values of the variables, the results of the arithmetical operation often contain critical errors if the predicted or forecasted values are not accurate.

Furthermore, because the dynamic range of the variables is narrowed in fixed point arithmetical methods, it is not so easy to adapt these methods to ordinary scientific technological calculation.

For the foregoing reasons, the use of floating point arithmetic is desirable, even though in adapting floating point methods to a digital differential analyzer, a greater number of memory and control devices are required than would be needed if fixed point arithmetic were used. As an example of a system which adopts floating point arithmetic to a differential digital analyzer, reference is made to Japanese Patent Laid-Open No. 25148/1975 (laid-open on Mar. 17, 1975), which describes a technique for the solution of differential equations, employing floating point arithmetic. The principal arithmetical unit of the differential digital analyzer disclosed in this publication is an integrator which performs the arithmetic operation and produces the integrated value through solution of the following difference equations:

$$Y_i = Y_{i-1} + \sum_{l=1}^{n} \Delta Y_l \quad (1)$$

$$R_i = R_{i-1} + \left( Y_i + K \sum_{l=1}^{n} \Delta Y_l \right) \times \Delta X_i - \Delta Z_i$$

where i is an integration number; n is an input number; Y is the integrand; $\Delta Y$ is the increment of the input variable; R is the residue of the integrated value of the integrand; K is a constant; $\Delta X$ is the increment of the independent variable; and $\Delta Z$ is the output increment (carry) of the integrated value.

Referring to Equation (1), if we let $$BR1 = R_{i-1} \quad (2)$$

$$BR2 = \left( Y_i + K \sum_{l=1}^{n} \Delta Y_l \right) \times \Delta X_i$$

Then $R_i$ in Equation (1) can be expressed as:

$$R_i = BR1 + BR2 - \Delta Z_i \quad (3)$$

Each of the three terms in Equation (3) may be expressed in floating point (mantissa-and-exponent) form, base two, as follows:

$$BR1 = BR1M \times 2^{BR1E} \quad (4)$$
$$BR2 = BR2M \times 2^{BR2E}$$
$$\Delta Z = \Delta Z_M \times 2^{\Delta Z_E}$$

where the letter "M" indicates a mantissa term and the letter "E" denotes an exponent term.

Of course, in determining $R_i$, before BR1M and BR2M may be added in the process of obtaining BR1+BR2 in accordance with Equation (3), their radix points must be aligned by shifting the radix point of the mantissa of the term having the smaller exponent to the left by a number of places equal to the difference of the two exponents, for example, unless the exponents BR1E and BR2E are equal. This requires a comparison of the two exponents and then a shifting of the radix point of one mantissa by a quantity corresponding to the difference. An example in decimal notation may be helpful to understand this operation. To add $2.0 \times 10^2$ to $5.0 \times 10^3$, the decimal (radix) point of the first term is shifted left so we have $0.2 \times 10^3$, which may be summed with $5.0 \times 10^3$ to obtain $5.2 \times 10^3$.

In the cited laid-open application, $\Delta Z$ is then calculated as follows:

$\Delta Z_E$ is set equal to BR1E or BR2E, whichever is greater. $\Delta Z_M$ is set equal to one, zero or minus one depending on the result of the addition of BR1 and BR2. When the sum of the mantissa (BR1M+BR2M) exceeds unity, an overflow condition occurs, and $\Delta Z_M = 1.0$. When the sum is negative, $\Delta Z_M = -1.0$. When the sum is greater than or equal to zero but less than unity, $\Delta Z_M = 0.0$. If this is the case $\Delta Z$ will be zero and further calculation will not improve the accuracy of the numerical solution. This is the disadvantage of the approach of Japanese Laid-Open No. 25148/1975 which is overcome by the present invention.

SUMMARY OF THE INVENTION

In order to eliminate the abovementioned problem, the present invention provides an improved floating point method of producing $\Delta Z$ and R, which method makes it possible to further improve the accuracy of the numerical solution in a digital differential analyzer.

To accomplish the abovementioned object, $\Delta Z_M$ is expressed in m bits (m is a positive integer greater than or equal to 2), as illustrated by the following equation in the present invention and $\Delta Z$ and R have certain values and are always produced in each iteration, irrespective of the magnitude of $\Delta Z$:

$$\Delta Z = \Delta Z_M \times 2^{\Delta Z_E} = S \cdot Z_1 Z_2 \ldots Z_{m-1} \times 2^{\Delta Z_E} \quad (5)$$

where S is the value of a sign bit; · is a radix; and $Z_1 \sim Z_{m-1}$ represent values of the first to $(m-1)$th bit below the radix, respectively, and are 0 or 1.

Another advantage of the present invention is that in all cases the upper $(m-1)$ bits of $R_m$ equal zero so that the size of the register needed for storing the value of $R_m$ is made smaller by $(m-1)$ bits in comparison with the conventional method.

These and other features of the present invention will become more apparent from the following detailed description of the preferred embodiments when considered with reference to the accompanying drawings.

DETAILED DESCRIPTION OF THE PREFERRED EMBODIMENTS

Figure 1I:
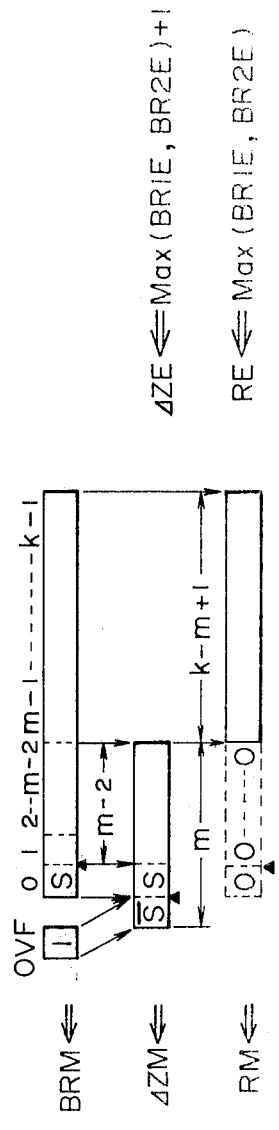
FIGS. 1 (I) through 1 (III) are diagrams which are useful for explaining the arithmetical method of the present invention.
Figure 1:
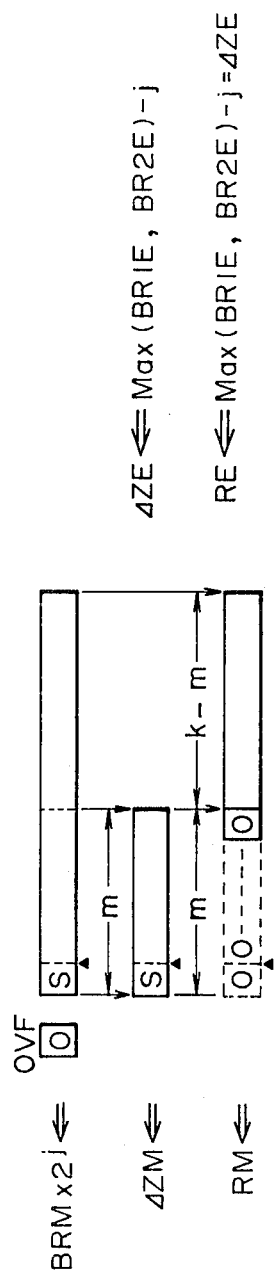

Referring to FIG. 1, the method of producing $\Delta Z$ and R will be described.

In FIG. 1 the exponents BR1E and BR2E are first compared and the mantissa BR1M or BR2M is shifted to the right, for example, by the bit number corresponding to the difference of the exponents $|BR1E-BR2E|$ in order to align the exponent portions with the greater exponent. The sum BRM of the mantissas BR1M and BR2M is then obtained and this sum BRM is stored in a register REG having a capacity of k bits.

A. The following operations are effected to calculate $\Delta Z$ on the basis of Equation (5).

Case (I)

When BRM overflows and the most-significant bit of the register REG (this bit corresponds to the bit position which sign S in Equation (5) is stored in) becomes 1, $\Delta Z$ is produced in accordance with the following procedures (i) through (iv):

(i) A value (S) is obtained by inverting the most-significant bit MSB of BRM is used as the most-significant bit MSB of $\Delta Z_M$, also known as the sign bit S.

(ii) The most-significant bit MSB of BRM is used as a value in the subsequent bit $Z_1$ of $\Delta Z_M$.

(iii) The values from the first bit to the $(m-2)$th bit of BRM are used as the values from the bit $Z_2$ to the bit $Z_{m-1}$ of $\Delta Z_M$, respectively.

(iv) $\Delta Z_E$ is determined from $\Delta Z_E = \text{Max}(BR1E, BR2E)+1$.

Case (II)

When BRM is not 0 and does not overflow, $\Delta Z_E$ is produced in accordance with the following procedures (i) and (ii):

(i) The contents of the register REG are shifted to the left by j bits until $BRM_o \oplus BRM_1 = 1$ ($\oplus$ is an exclusive OR) for the value of BRM at $BRM_o$ and the value of BRM at $BRM_1$, or until $|BRM| < 0.5$. When this is established, the values in the upper m bits including the sign bit of BRM are used as $\Delta Z_M$.

(ii) $\Delta Z_E$ is obtained by setting $\Delta Z_E = \text{Max}(BR1E, BR2E) - j$.

Case (III)

When BRM is 0; $\Delta Z_E$ is produced in accordance with the following procedures:

(i) the values in the upper m bits including the sign bit of BRM are used as $\Delta Z_M$, i.e., $\Delta Z_m = 0$.

(ii) $\Delta Z_E$ is then equal to $\Delta Z_E = \text{Min}(BR1E, BR2E) = \text{CMIN}$.

B. The following operations are effected to calculate R.

When the residue $R_i$ of the integrated value of the integrand is expressed as $R_i = R_M \cdot 2^R E$ ($R_M$: mantissa, $R_E$: exponent)

$R_M$ and $R_E$ in each of the abovementioned Cases (I) through (III) can be obtained in the following manner:

Case (I)

(i) $R_M$ is set equal to the remaining, less-significant bits of BRM, i.e., bits to $(K-1)$ of BRM becomes bits i to $(K-m+1)$ of $R_M$.

(ii) $R_E$ is obtained from $R_E = \text{Max}(BR1E, BR2E)$.

Cases (II) and (III)

(i) Bits m to K of $R_M$ are set equal to bits m to k of BRM, respectively, and bit $m-1$ of $R_M$ is made equal to zero (0).

(ii) $R_E$ is made equal to $\Delta Z_E$.

Incidentally, as shown in FIG. 1, the upper $m-1$ bit of $R_M$ in Cases (I) through (III) are zero so that the size of the register REG for storing $R_M$ is made smaller by $(m-1)$ bits in comparison with the conventional method.

Figure 2:
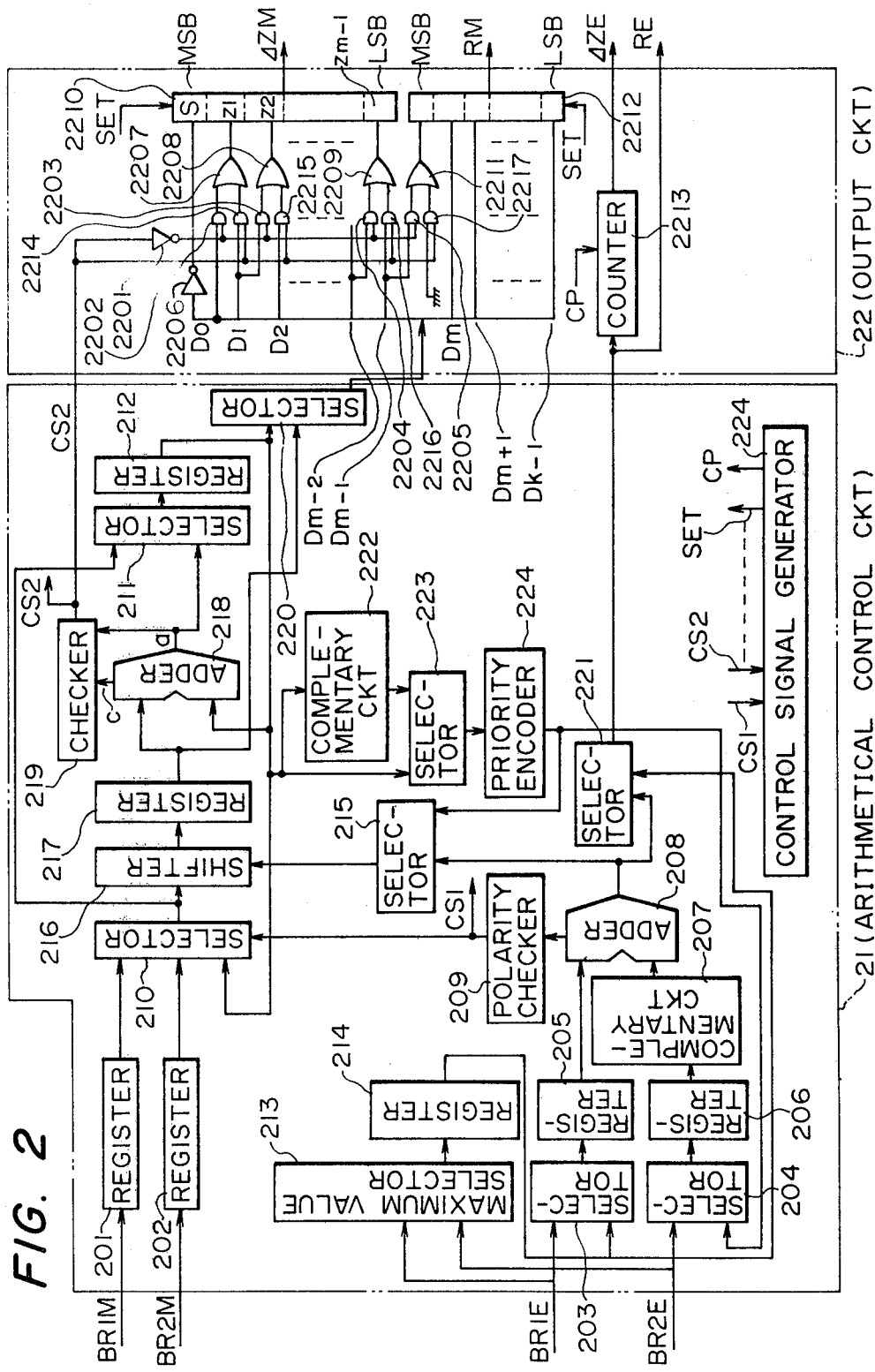
FIG. 2 is a circuit diagram of an embodiment of the present invention.

FIG. 2 is a block diagram showing the arithmetical circuit for calculating $\Delta Z$ and R by use of the arithmetical method shown in FIG. 1. The arithmetical circuit consists of an arithmetical control circuit 21 and an output circuit 22.

In FIG. 2 the mantissas BR1M and BR2M in the aforementioned Equation (4) are set in registers 201 and 202. The exponents BR1E and BR2E in the aforementioned Equation (4) are selected by selectors 203 and 204 and are set in registers 205 and 206, respectively. The exponent BR2E is produced from the register 206 and is converted into an exponent $(-BR2E)$ whose sign is inverted by a complementary circuit 207. Addition of this negative value to the exponent BR1E, derived from the register 205, is performed by an addition circuit 208, essentially effecting a subtraction of the exponents BR1E and BR2E. The polarity of the result of this operation (BR1E-BR2E) is checked by a polarity checker 209.

When the result of the polarity check is positive, indicating that BR1E is greater than BR2E, the output signal CS1 of the polarity checker 209 becomes a logic "1" so that the mantissa BR1M in the register 201 is selected by the selectors 210 and 211 and set in the register 212, and at the same time, the greater exponent BR1E is selected by a maximum value selection circuit 213 and is set in the register 214.

Next, the abovementioned result of addition (BR1E-BR2E) is selected by the selector 215 and is set in a bit shift circuit 216. Then, the mantissa BR2M selected by the selector 210 is shifted to the right by (BR1E-BR2E) in the bit shift circuit 216, the result being set in the register 217.

Addition of the contents of this register 217 and the mantissa BR1M, stored in the register 212, is carried out by the addition circuit 218, and the result of addition is selected by the selector 211 and is set in the register 212. At the same time, the checker 219 checks whether or not the result of the addition is zero and whether or not an overflow exists, and the arithmetical operations corresponding to the aforementioned Cases (I) through (III) are carried out in accordance with the check result.

(A) When the check result is as provided in Case (I):

The contents of register 212 are selected by the selector 220 and delivered to the output circuit 22 as parallel data $(D_0, D_1, D_2, \ldots, D_{m-2}, D_{m-1}, \ldots D_{k-1})$ together with the output signal CS2 of the checker 219. The signal CS2 consists of two bits (CS20, CS21) and CS20 is changed into a logic "1" at the output circuit 22 by an inverter 2201, whereby AND gates 2202, 2203, ..., 2204 and 2205 are opened. The data $D_0$ passes through an OR gate 2207 while the data $D_1, \ldots, D_{m-2}$ pass through OR gates 2208, ..., 209 and are set to a buffer register 2210 as $z_1, z_2, \ldots, z_{m-1}$ in Equation (6) by the set signal SET.

The data $D_0$ inverted by the inverter 2206 is also set as S in Equation (5) to the MSB of the buffer register 2210. As a result $\Delta Z_M$ in Equation (5) can be obtained at the output of the buffer register 2210.

The data $D_{m-1}$ passes through the AND gate 2205 and the OR gate 2211, and is set in the MSB of the buffer register 2212 by the set signal SET while the data $D_m, D_{m+1}, \ldots, D_{k-1}$ is directly set in the buffer register 2212 by the set signal SET, so that $R_M$ can be obtained as the output of the buffer register 2212.

On the other hand, as to the exponent portion, the value that is set in the abovementioned register 214, i.e., Max(BR1E, BR2E)=BR1E is selected by the selector 221 and BR1E is as such obtained as $R_E$ from the output circuit 22. Continuously, after the exponent BR1E is set in a counter 2213 of the output circuit 22, a count pulse CP is generated and the counter 2213 is incremented by 1 to BR1E+1=$\Delta Z_E$. Hence, $\Delta Z_E$ can be obtained as the output of the counter 2213 in accordance with Equation (5).

(B) When the check result is as provided in Case (II):

The contents of register 212 or one of outputs obtained through the complementary circuit 222 is selected by the selector 223 and is applied to a priority encoder 224. The priority encoder 224 determines the shift quantity (bit number) j for shifting the content of the register 212 until the required criteria is satisfied.

When $\Delta Z_M$ given by Equation (5) is $\Delta Z_M = 0.010 \ldots 0$, for example, j=1 is produced as an output and when $\Delta Z_M = 1.010 \ldots$, the complement is $0.110 \ldots 0$ of $\Delta Z_M$ obtained by the complementary circuit 222 is selected by the selector 223 and is applied to the priority encoder 224 so that j=0 is produced as the output. Furthermore, when $\Delta Z_M = 1.1110 \ldots 0$, for example, the complement=$0.0010 \ldots 0$ is obtained by the complementary circuit 222 and j=2 is likewise produced as the output.

This shift quantity j is selected by the selector 215 and is set to the bit shift circuit 216. At the same time, the contents of register 212 selected by the selector 210 is shifted to the left by j by the bit shift circuit 216 (this corresponds to the case where it is multiplied by $2^j$), and the shift result is set in the register 217. The shift quantity j is selected by the selector 215 and is set in the bit shift circuit 216.

The contents of register 217 is selected by the selector 220 and delivered to the output circuit 22. If these K bit data are expressed as $(D_0', D_1', D_2', \ldots, D'_{m-2}, D'_{m-1}, \ldots, D'_{k-1})$, CS20 of the output signal CS2 of the checker 219 becomes logical "1" for this case. Accordingly, the data $D_0'$ of the most-significant bit is used, as such as S in Equation (5) while the data $D_1', D_2', \ldots, D'_{m-1}$ passes through the AND gate 2214 and OR gate 2207, the AND gate 2215 and OR gate 2208, ..., the AND gate 2216 and OR gate 2209, respectively, and is set in the buffer register 2210 as $z_1, z_2, \ldots, z_{m-1}$ in Equation (5) by the set signal SET. Hence $\Delta Z_M$ can be obtained as the output of the buffer register 2210.

The value "0" is set in the MSB of the buffer register 2212 through the AND gate 2217 and the OR gate 2211 and the data $D'_m, \ldots, D'_{k-1}$ is directly set in the buffer register 2212 by the set signal SET so that $R_M$ can be obtained as the output of the buffer register 2212. On the other hand, the value of the exponent portion Max(BR1E, BR2E)=BR1E that has been set in the register 214, is selected by the selector 203 and is set in the register 205, while the output j of the priority encoder 224 is selected by the selector 204 and is set in the register 206.

The output (BR1E) of the register 205 is added to the output (−j) of the complementary circuit 207 for seeking the complement of the output of the register 206 by the adder 208 and the following addition output:

Max(BR1E, BR2E)−j=BR1E−j is selected by the selector 221 and is delivered to the output circuit 22. In the output circuit 22, the output of the selector 221 is produced as $\Delta Z_E$ and $R_E$. In other words, the count pulse CP is not generated by the counter 2213 and its input is merely applied to the counter 2213 so that the counter output becomes $\Delta Z_E$.

(C) When the check result is as provided in Case (III):

The content of the register 212 (the value of each bit is zero for the bits from 0 to k−1 bit) is selected by the selector 220 and is delivered to the output circuit 22. In this case, since CS20 of the signal SC2 is a logical "1", the output of the selector 220 is set in the buffer registers 2210 and 2212 through the same gates as in Case (II). As a result, $\Delta Z_M$ can be obtained as the output of the buffer register 2210 and $R_M$ can be obtained as the output of the buffer register 2212.

On the other hand, setting of the exponent portion is made such that:

BR1E=CMIN, BR2E=0, where CMIN is the minimum value of the exponents, so that CMIN is set in the register 214. In accordance with the same procedures as in Case (II), the output CMIN obtained from the adder 208 is selected by the selector 221 and delivered to the output circuit 22 so that $\Delta Z_E$ and $R_R$ can be obtained from $$Z_E = CMIN, \ R_E = CMIN.$$

A series of control signals necessary for the abovementioned arithmetic operation are produced from a control signal generation circuit 224 in the arithmetical control circuit 21. This control signal generation circuit 224 may take the form of a conventional programmed sequencer or a commercially-available microcomputer.

In the embodiment shown in FIG. 2, only the set signal SET and the count pulse signal CP are illustrated among a series of control signals generated by the output signal CS1 of the polarity checker 209 and the output signal CS2 of the checker 219 as the input timing signals and the others are deleted for ease of description.

As the polarity checker 209, it is possible to use, for example, a monostable multi-vibrator which is triggered at the rise portion of the borrow output in the adder 208.

The bit shift circuit 216 includes a counter for designating the number of bits to be shifted, a shift register for storing the input data, and a gate circuit for delivering a shifting pulse signal to the shift register until the contents of the counter becomes zero, for example.

The checker 219 consists of a comparator for checking whether or not the addition output a of the adder 218 is zero and a circuit (a ROM may be used) for generating the signal CS2 (consisting of two bits) corresponding to the aforementioned Case (I) through Case (III) from the output of the comparator and the carry output C of the adder 218.

Next, when the result of the polarity check of the result of addition (BR1E−BR2E) is negative, the mantissa BR2M is set in the register 212 while the exponent BR2E is set in the register 214. Thereafter, the same procedures may be carried out by replacing BR1M and BR2M, and BR2E, respectively.

As described in detail in the foregoing, in accordance with the method of the present invention, an output increment $\Delta Z$ having a certain definite value occurs for each iteration irrespective of the quantity of the output increment $\Delta Z$ so that the residue of the integrated value becomes smaller and the accuracy of numerical solution can be greatly improved in comparison with a digital differential analyzer operating on the basis of the conventional method.

Figure 3:
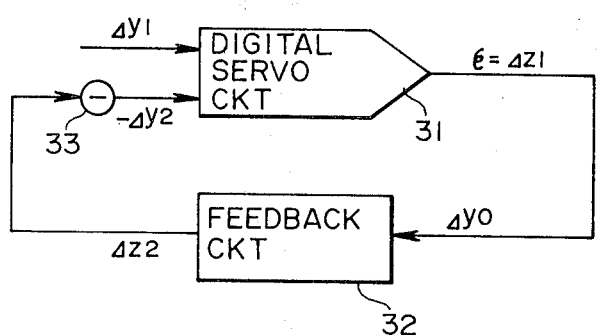
FIG. 3 is a schematic circuit diagram of a digital servo system in accordance with the present invention.

In the arithmetic operation including a servo system shown in FIG. 3, for example, it will be assumed that the error of the servo system $$\epsilon = \Delta Z_1 = \Delta Y_1 - \Delta Y_2$$

is to converge to zero, where the output increment appearing at the output of the digital servo circuit 31 is $\Delta Z_1$ and is an inut increment $\Delta y_o$ for a feedback circuit 32, and an output increment $\Delta Z_2$ of this feedback circuit 32 is passed through a polarity inverter 33 to obtain one of the input increments $(-\Delta y_2)$ of the digital servo circuit 31 in order to express the error of the servo system by means of the abovementioned equation as the difference between the input increment $-\Delta y_2$ and the other input increment $\Delta y_1$ of the digital servo circuit 31. If the digital differential analyzer in accordance with the present invention is used as the feedback circuit 32 in this case, $\Delta Z_2$ having a certain definite value is always generated at its output for each iteration so that $\epsilon$ is rapidly converted to zero and the accuracy of numerical solution can be remarkably improved in comparison with the conventional method.

Figure 4B:
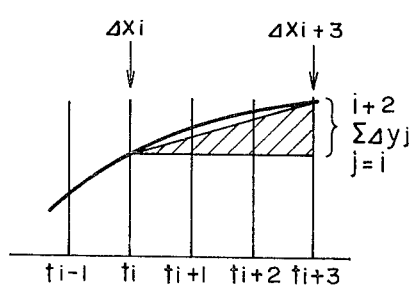
FIGS. 4(a) and 4(b) are diagrams which are useful for explaining the arithmetical method when the independent variable of integration is not variable with time.
Figure 4A:
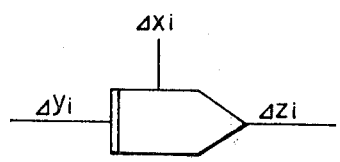

When the integration independent variable x is a variable other than the time variable t, the same increment $\Delta x_i$ of the independent variable in FIG. 4(a) is not necessarily used for each iteration. Namely, as shown in FIG. 4(b), for example, it is not applied at $t_{i-1}$, $t_{i+1}$, $t_{i+2}$. Accordingly, in the digital differential analyzer using the conventional method, it has been necessary to calculate the sum of the input increments $$\sum_{j=1}^{i+2} \Delta y_j$$

and to store the result in a memory exclusively for that purpose.

If the digital differential analyzer in accordance with the present invention is employed, however, $\Delta x_i$ is always produced as the output increment $\Delta Z_{i-1}$ in the preceding stage and consequently, $\Delta x_i$ in FIG. 4(a) is always applied as the input, thereby eliminating the necessity of the abovementioned memory.

While We have shown and described a single embodiment in accordance with the present invention, it is understood that the same is not limited to the details shown and described herein but is intended to cover all changes and modifications known to one of ordinary skill in the art, and therefore, We do not wish to be limited to the details shown and described herein but intend to cover all such changes and modifications obvious to those skilled in the art.

What is claimed is:

1. In an apparatus in which a first quantity BR1, expressed in the form of a mantissa BR1M and a base two exponent BR1E, and a second quantity BR2, expressed in the form of a mantissa BR2M and a base two exponent BR2E are summed, including means for aligning the mantissae BR1M and BR2M in accordance with the relative values of the exponents BR1E and BR2E, means for summing the values of the mantissae BR1M and BR2M in a register to obtain a quantity BRM, means responsive to the value of BRM for determining a mantissa value $\Delta Z_M$ and a base two exponent value $\Delta Z_E$ of a third quantity $\Delta Z$, where $\Delta Z_M$ is expressed in m bits and BRM is expressed k bits, and means for determining a fourth quantity R, equal to BR1+BR2−$\Delta Z$ in the form of a mantissa $R_M$ and a base two exponent $R_E$, the improvement which comprises (a) BRM register means of k bits capacity for holding the value of BRM in the form of bits designated $BRM_0$, $BRM_1$, ..., and an overflow bit;

(b) comparing means for comparing BR1E and BR2E to determine a difference j therebetween;

(c) shift register means for shifting the value of BRM by j bits;

(d) first buffer register means of m bits capacity for holding the value of $\Delta Z_M$ in the form of bits designated S, $Z_1$, $Z_2$, ..., $Z_{m-1}$;

(e) second buffer register means for holding the value of $R_m$;

(f) $R_E$ output means;

(g) $\Delta Z_E$ output means;

(h) checker means, for generating outputs dependent on whether the overflow bit of said BRM register means is set and on whether the contents of said BRM register means equals zero; and (i) output circuit means for setting the values of said first buffer register means, said second buffer register means, said $R_E$ output means; and said $\Delta Z_E$ output means based on the output of said checker means.

2. The apparatus of claim 1, wherein said output circuit means includes means which is responsive to said checker means, when an overflow condition is sensed by said checker means, including (i) first means for setting the most-significant bit S of said first buffer register means equal to the inverted value of the most-significant bit $BRM_o$ of said BRM register means;

(ii) second means for setting the next most-significant bit $Z_1$ of said first buffer register means equal to the value of the most-significant bit $BRM_o$ of said BRM register means;

(iii) third means for setting the bits $Z_2$ through $Z_{m-1}$ of said first buffer register means equal to the values of bits $BRM_1$ through $BRM_{m-2}$, respectively;

(iv) fourth means for setting the bits of said second buffer register means equal to the values of bits $(m-1)$ through $(k-1)$ of said BRM register means;

(v) fifth means for setting said $R_E$ output means equal to the greater of BR1E and BR2E; and (vi) sixth means for setting said $\Delta Z_E$ output means equal to one plus the greater of BR1E and BR2E.

3. The apparatus of claim 1, wherein said output circuit means includes means which is responsive to said checker means, when the contents of the BRM register are not equal to zero and the overflow bit of said BRM register means is not set, including (i) first means for controlling said comparing means to determine the shift quantity j for shifting the contents of the BRM register means;

(ii) second means for controlling said shift register means to shift the contents of the BRM register means to the left until the value of exclusive or-ing $BRM_\phi$ with $BRM_1 = 1$ or until $|BRM| \geq 0.5$ the cumulative shift being j bits, (iii) third means for setting the bits S, $Z_1$, $Z_2$, ..., $Z_{m-1}$ of said first buffer register means equal to the respective bits of said shift register means;

(iv) fourth means for setting the most-significant bit of said second buffer register means to zero;

(v) fifth means for setting the remaining bits of said second buffer register means equal to the values of bits m through $k-1$ of said shift register means;

(vi) sixth means for setting said $\Delta Z_E$ output means and said $R_E$ output means equal to the greater of BR1E and BR2E less the value j.

4. The apparatus of claim 1, wherein said output circuit means includes means which is responsive to said checker means, when the contents of said BRM register means equals zero, including means for setting the bits of said first and second buffer registers to zero and means for setting said $R_E$ output means and said $\Delta Z_E$ output means to the lesser of BR1E and BR2E.

5. The apparatus of claim 1, wherein said apparatus is a digital differential analyzer.

6. In a method for use in a digital differential analyzer for performing the operation $$R_i = R_{i-1} + (Y_i + K \sum_{l=1}^{n} \Delta Y_l) \Delta X_i - \Delta Z_i$$

where Y is an integrand, $\Delta Y$ is an increment of an input variable, R is a residue of the integrated value of the integrand, $\Delta X$ is an increment of an independent variable, $\Delta Z$ is an output increment of the integrated value of the integrand, K is a constant, and n is an input number (a positive integer), in the ith iteration; which method includes setting a first mantissa $M_1$, a second mantissa $M_2$, a first exponent $E_1$ and second exponent $E_2$ for expressing the abovementioned equation as:

$$R_{i-1} = M_1 \times 2^{E_1}, (Y_i + K \sum_{l=1}^{n} \Delta Y_l) \Delta X_i = M_2 \times 2^{E_2},$$

adjusting the radix points of the first and second mantissae in the bit number corresponding to the difference between the first and second exponents to adjust the mantissa portion to the greater exponent of the two, and thereafter calculating the mantissa portion to perform the abovementioned arithmetical operation and to obtain $\Delta Z$ and R; the improvement wherein the mantissa portion of $\Delta Z$ is expressed in terms of $m(\geq 2)$ bits by adding the most-significant bit corresponding to the first bit above the radix point to bits below the radix point and then adjusting the radix point in accordance with the result of the addition in order to always obtain $\Delta Z$ and R in accordance with the quantity of the result of addition for each iteration.

7. The method for use in a digital differential analyzer as defined in claim 6, wherein, when the result of addition overflows from the most-significant bit, setting a value obtained by inverting the value of the most-significant bit in the result of the addition and the value of the most-significant bit to the value of the most-significant bit and to the value of the first bit below the radix point in the mantissaportion of $\Delta Z$, respectively, and when m is greater than 3, setting the values from the second bit below the radix point to the $(m-1)$th bit below the radix point to the values for the second bit to the $(m-1)$th bit below the radix point in the mantissa portion of $\Delta Z$; determining $\Delta Z$ by adding 1 to the greater exponent of the first and second exponents; and determining R by using the values from the $(m-1)$th bit below the radix point as the mantissa portion of R and also using the greater exponent of the first and second exponents as the exponent portion of R.

8. The method for use in a digital differential analyzer as defined in claim 6, wherein, when the result of addition neither overflows from the most-significant bit nor is zero, shifting the position of the radix point by a predetermined bit number until the absolute value of the result of addition exceeds a predetermined threshold value; setting the values up to mth significant bits including the most-significant bit after shift to the mantissa portion of $\Delta Z$ while setting the values from the mth bit below the radix point to the least-significant bit below the radix point to the mantissa portion of R; and determining $\Delta Z$ and R by using a value obtained by subtracting the abovementioned predetermined bit number from the greater exponent of the first and second exponents as the exponent portion for each of $\Delta Z$ and R.

* * * * *